United States Patent
San Miguel Nuñez et al.

(10) Patent No.: US 11,447,339 B2
(45) Date of Patent: Sep. 20, 2022

(54) MANUFACTURING PROCESS FOR A REINFORCED CONVEYOR BELT AND PRODUCT THEREBY OBTAINED

(71) Applicant: AFHER EUROBELT, S.A., Valladolid (ES)

(72) Inventors: Javier San Miguel Nuñez, Valladolid (ES); Carlos Herrero Perez, Valladolid (ES); Miguel De Garnica Escribano, Valladolid (ES)

(73) Assignee: AFHER EUROBELT, S.A., Valladolid (ES)

( * ) Notice: Subject to any disclaimer, the term of this patent is extended or adjusted under 35 U.S.C. 154(b) by 0 days.

(21) Appl. No.: 17/317,511

(22) Filed: May 11, 2021

(65) Prior Publication Data
US 2021/0354927 A1    Nov. 18, 2021

(30) Foreign Application Priority Data
May 12, 2020   (EP) ...................................... 20382388

(51) Int. Cl.
*B65G 17/24*    (2006.01)
*B65G 15/34*    (2006.01)
*B65G 15/40*    (2006.01)

(52) U.S. Cl.
CPC ............. *B65G 15/34* (2013.01); *B65G 15/40* (2013.01)

(58) Field of Classification Search
None
See application file for complete search history.

(56) References Cited

U.S. PATENT DOCUMENTS 7,364,038 B2 *  4/2008  Damkjaer ............... B65G 17/32
                                                198/853
8,881,890 B2 * 11/2014  MacLachlan .......... B65G 17/40
                                                198/779
9,090,401 B2 *  7/2015  Guener ................ B65G 17/086

* cited by examiner

*Primary Examiner* — Kavel Singh
(74) *Attorney, Agent, or Firm* — ArentFox Schiff LLP (57) ABSTRACT

The invention relates to a manufacturing process for a reinforced conveyor belt and product thereby obtained comprising a plurality of plastic modules wherein each module comprises at least one opening that houses a roller and is configured to rotate with respect to a shaft, which consists of a metal tube able to be filled with plastic material; and which comprises the stages of (i) inserting the shaft in an injection mold for a plastic module in the region corresponding to the opening; and (ii) a single stage of injecting the plastic module such that said injected plastic fills the inside of the shafts forming a single assembly or structure with the body of the module.

8 Claims, 7 Drawing Sheets

MANUFACTURING PROCESS FOR A REINFORCED CONVEYOR BELT AND PRODUCT THEREBY OBTAINED

This application claims priority to European Patent Application No. 20382388.5 filed on May 12, 2020, the entire contents of which are hereby incorporated by reference.

TECHNICAL FIELD

The present invention consists of a reinforced belt, as well as the manufacturing method thereof. The present invention relates to a solution for technical problems related to the weakening of modules of any conveyor belt in which holes or openings must be made to include rollers configured for a hypothetical change in direction and/or speed of the objects being conveyed.

BACKGROUND OF THE INVENTION

In the state of the art, it is known that to automate and facilitate the transportation of any product there are conveyor belts with rollers inserted therein, which are sometimes manufactured complete with rollers configured to handle the accumulation of product, lateral transfers, movements of the product itself on the conveyor surface itself and/or to reduce the friction between the belt and the conveyor surface.

A first example of a conveyor belt of the aforementioned type is described in document U.S. Pat. No. 3,550,756A, which discloses a conveyor belt with rollers for 90° transfers. Said document describes the transfer of a product by placing inclined rollers on a conveyor. When the product arrives at the deflector by means of the rollers, it moves perpendicularly to a second conveyor, with little friction, since the product is moving on inclined rollers.

Document EP066530B1 discloses a conveyor belt with rollers inserted in the conveyor surface thereof, with the aim of reducing the friction of the product with the conveyor belt when products accumulate. The device has the particular feature that the product can be stopped while the belt keeps moving without damaging the product. This document describes how certain modules of the belt are arranged as idler rollers on the conveyor surface when the product is stopped on the belt. The idler rollers roll below the product, preventing friction on the belt, which continues to move below said product while it is stopped.

Document EP1272406B1 discloses a conveyor belt with rollers inserted in the lower part of the modules of the belt to reduce friction between the belt and the support surface, converting the sliding by friction to sliding by rolling. This document describes that the rollers are inserted in the modules of the conveyor belt which, in turn, are in contact with the support surface of the conveyor belt, creating a rolling surface, thereby reducing the friction coefficient between the product and the rolling surface.

Document EP1868924B1 discloses a conveyor belt arranged on rollers inserted at different angles and driven from below to move the packages—products—on the conveyor belt to change their position during transportation. The placement of rollers at different angles on the belt, and making them rotate from below by means of different actuation systems, produces a movement of the products to be conveyed on the conveyor surface itself while the belt, in turn, also moves.

Lastly, that which is disclosed by document EP1398282B1, which describes a conveyor belt with rollers inserted in the modules in different directions to be actuated from below, is also known. This document describes that holes or openings are made in the modules of the belt through which the shaft/roller assembly is introduced to perform the relevant operations, in this case driven from below and generating movement on the upper surface, with the aim of moving the product on top of the same. Furthermore, in this solution the insertion of the shaft/roller sets is done by taking advantage of the fact that the module is manufactured in two halves, the holes always being made on both parts.

Considering all of these solutions already known in the state of the art, in which rollers are inserted in the conveyor belt, these solutions can be classified by two main distinguishing features: those that have driven rollers and those that do not.

Now, in all of these applications in which the rollers are driven in order to generate movement on the upper or conveyor part, for example in documents EP1868924B1 and/or EP1398282B1, a hole must always be made in the modules of the belt to introduce the shaft/roller set and the shaft/roller set must be free on both sides. When this opening is made, the conveyor belt becomes weakened, since material is removed and the holes are only joined at the sides of those openings. On the belt, a plurality of elements, which can be called resistant braces, are defined to support all of the resistance of the belt, which weakens the assembly or structure of said belt. Furthermore, the shaft/roller assembly that is necessary to perform those movements, such as in EP1398282B1, requires through holes and perimeter slots so that the shaft/roller can be inserted and moved, which also weaken said connection and, therefore, the structure of the belt.

Document US2012298487A1 describes a manufacturing method for a module of a conveyor belt that comprises the stages of: (i) molding a shaft using a first injection mold and removing the injection mold from the shaft; (ii) molding an intermediate portion around the shaft using a second injection mold such that at least one end of the shaft is embedded in an intermediate portion; (iii) wherein the intermediate portion comprises at least one articulation element on the first end and at least one articulation element on the end opposite the first end. This invention essentially describes a method for manufacturing a module wherein the ends, especially designed for such purpose and with complex geometries, are embedded in the module when it is injected, locking the shaft so that it does not move.

Furthermore, document US2012298487A1 describes a plastic shaft on which a roller is mounted that is divided into two bodies that are integrally joined to one another. This solution has a clear drawback in that the rollers are made up of two plastic parts joined to one another by mechanical means—mechanical plastic joints, such as tabs or other equivalent elements—and end up easily breaking over periods of continuous use, and a basic requirement for conveyor belts is reliability and durability. Furthermore, given that both the shaft and the roller are made of plastic material, they wear relatively quickly, even if special materials are used for friction. Moreover, these types of materials have the problem of contracting and expanding, and therefore, depending on the working temperature, they could expand excessively, to a larger size than the hole made for such purpose, and bulge.

Considering the aforementioned known documents, the technical solution provided in the present invention solves the problem of the weakening modules of the conveyor belt by manufacturing a conveyor belt with inserted rollers for the movement thereof that is reliable and durable. To achieve this aim, the present invention provides the modules with more resistant braces inside the openings or holes using the very rotational shaft of the roller to reinforce the area according to claim 1.

DESCRIPTION OF THE INVENTION

One object of the invention is a manufacturing process for a reinforced conveyor belt and product thereby obtained that enables a modular plastic conveyor belt to be obtained that is reinforced by a plurality of reinforcement pins inserted in holes in the conveyor belt and configured as shafts of a plurality of rollers according to the independent claims included at the end of the present specification. The dependent claims thereof show particular and/or preferred embodiments of the present invention.

More specifically, the manufacturing process for a reinforced conveyor belt comprising a plurality of plastic modules wherein each module comprises at least one opening that houses a roller and is configured to rotate with respect to a shaft that consists of a metal tube able to be filled with plastic material; and wherein the process is characterized in that it comprises the stages of (i) inserting the shaft/roller assembly in an injection mold for a plastic module in the region corresponding to the opening, wherein the shaft is preferably a steel tube and the roller was previously manufactured in another mold; and (ii) a single stage of injecting the plastic module such that said injected plastic fills the inside of the shaft/tube, forming a single assembly or structure with the body of the module.

The roller will normally be made of a rigid plastic with a good friction coefficient with the steel and will be able to have a rubbery outer layer in order to be more adhesive, in other words, the roller is made up of, or manufactured with, two materials. Furthermore, in another practical embodiment, the roller is solid and monobloc, or made up of independent parts assembled together.

In a practical embodiment the roller and the shaft are assembled independently and prior to the insertion thereof in the injection mold. In another practical embodiment, the roller is injected on the shaft before the insertion thereof in the injection mold.

In a second aspect of the invention, the reinforced conveyor belt comprises a plurality of modules assembled together and obtained according to the previously described manufacturing process. This conveyor belt therefore consists of a plurality of modules that comprise an opening that houses a roller configured to reduce the friction between a product and the conveyor surface of the reinforced conveyor belt and is characterized in that it comprises a shaft arranged in each opening, wherein said shaft is a metal tube filled with molded plastic and fixed to the plastic of the module assembly and is configured as a rotational shaft of the respective roller thereof.

In a practical embodiment, the arrangement or orientation of the rollers in the reinforced conveyor belt is variable, always being diametral, but able to be arranged with a degree of inclination comprised between 0° and 360° with respect to the axis of movement of the reinforced conveyor belt.

BRIEF DESCRIPTION OF THE DRAWINGS

To complement the description provided herein, and for the purpose of helping to make the characteristics of the invention more readily understandable, said description is accompanied by a set of drawings constituting an integral part of the same, which by way of illustration and not limitation represents the following.

PREFERRED EMBODIMENT OF THE INVENTION

Figure 1:
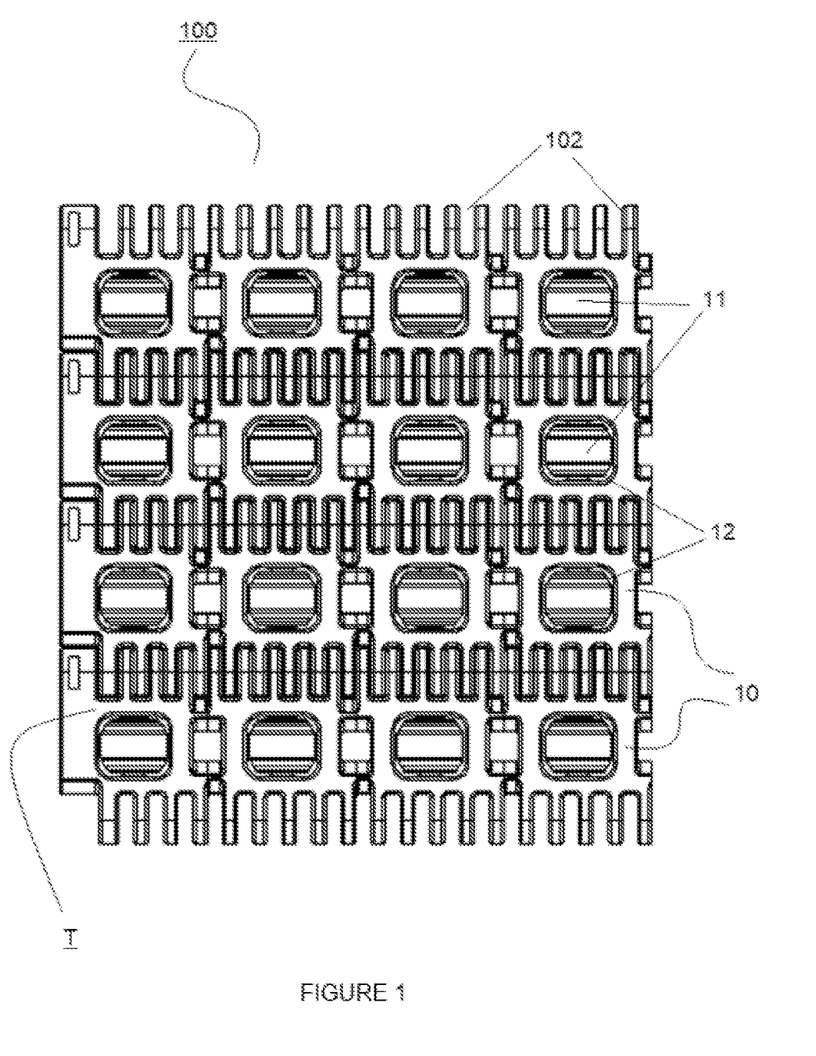
FIG. 1 shows a front plan view of a portion of the reinforced conveyor belt (100) according to the manufacturing process described in the present invention.

FIG. 1 shows a conveyor belt 100 that comprises a plurality of modules 10, 10'. In the image shown in FIG. 1, the conveyor belt 100 comprises four rows with four modules 10, 10' per row. As such, each row is integrated with the contiguous row thereof by means of an articulated shaft 101 transverse to the advance direction of the belt 100, wherein the advance direction is illustrated by an arrow, while each module 10, 10' is associated with the lateral contiguous module thereof by means of a male-female joint 102. A person skilled in the art easily understands that this conveyor belt 100 is a modular conveyor belt, but it can be used in any other type of conveyor belt made of plastic.

Each module 10, 10' further comprises a circular roller 11, 11' embedded in a hole 12, 12' such that the outer surface or rolling surface of the roller 11, 11' is substantially tangent to the conveyor surface T of the conveyor belt 100, and therefore the rollers 11, 11' reduce the friction between the conveyor surface T and the product being conveyed. It is understood that said outer tangent surface is a parallel plane that makes it so the product rests on the rollers. Thanks to the reduction in friction or abrasion, a change in direction of the products, the accumulation thereof at a specific point and their acceleration or slowing is facilitated. Furthermore, the hole 12, 12' has two lateral areas that are configured as a structural reinforcement area or region 14, 14', making the assembly more rigid.

Figure 2:
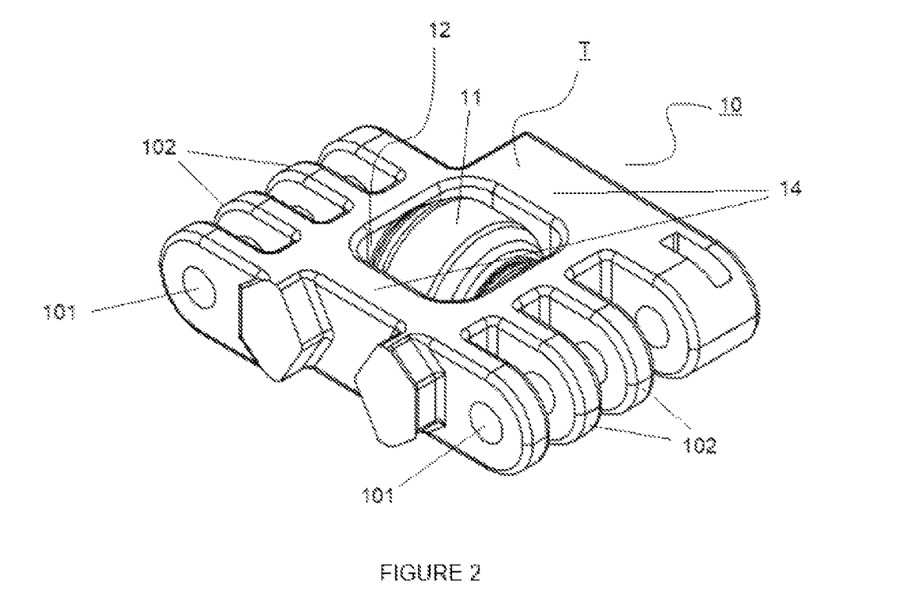
FIG. 2 shows an isometric view of a module (10) according to a first practical embodiment of the present invention.
Figure 3:
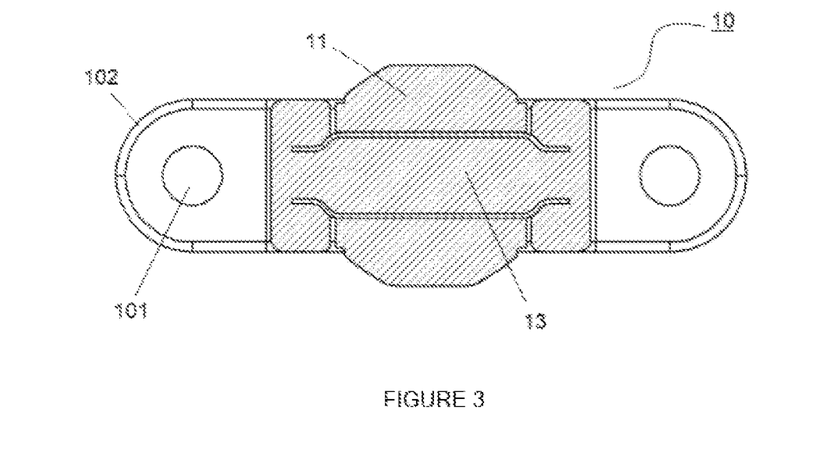
FIG. 3 shows a cross section of the module (10) shown in FIG. 2.
Figure 6:
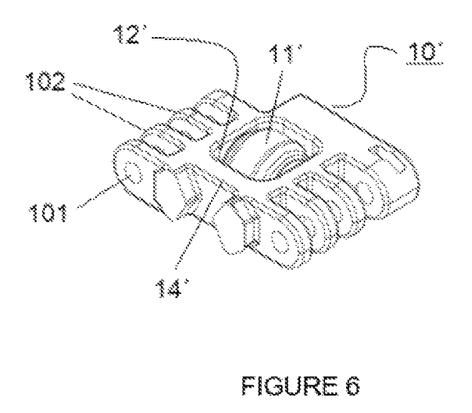
FIG. 6 shows an isometric view of a module (10') according to a second practical embodiment of the present invention.
Figure 7:
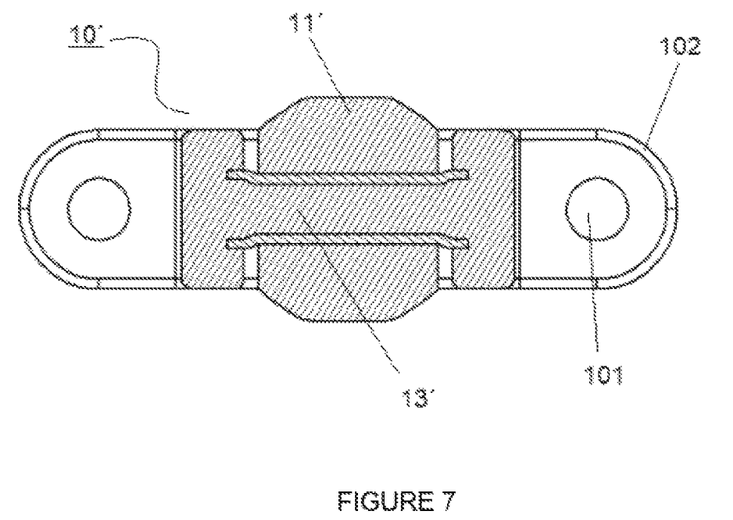
FIG. 7 shows a cross section of the module (10') shown in FIG. 6.

A detailed and isolated view of each module 10, 10' is shown in FIGS. 2 and 6. More specifically, as will be explained in further detail below, a first practical embodiment of the invention is defined in FIGS. 2 to 5 while a second practical embodiment of the invention is defined in FIGS. 6 to 9.

First Practical Embodiment

Figure 4:
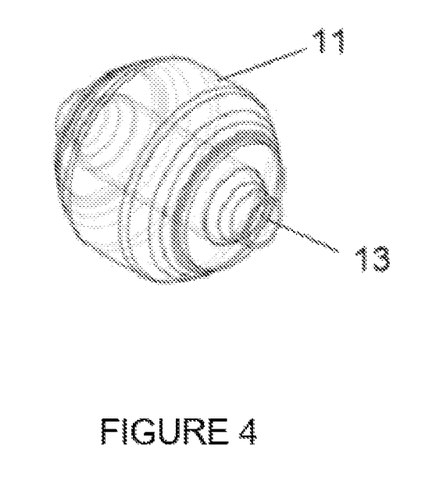
FIG. 4 shows a view of the roller (11) and shaft (13) assembly according to the first practical embodiment of the present invention.
Figure 4A:
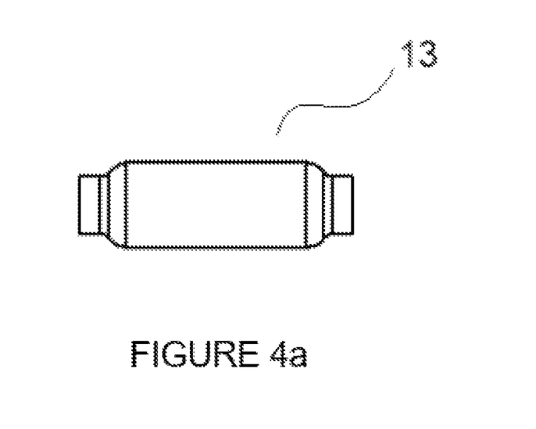
FIG. 4a shows a detail of the shaft (13) or shaft-tube (13).
Figure 5:
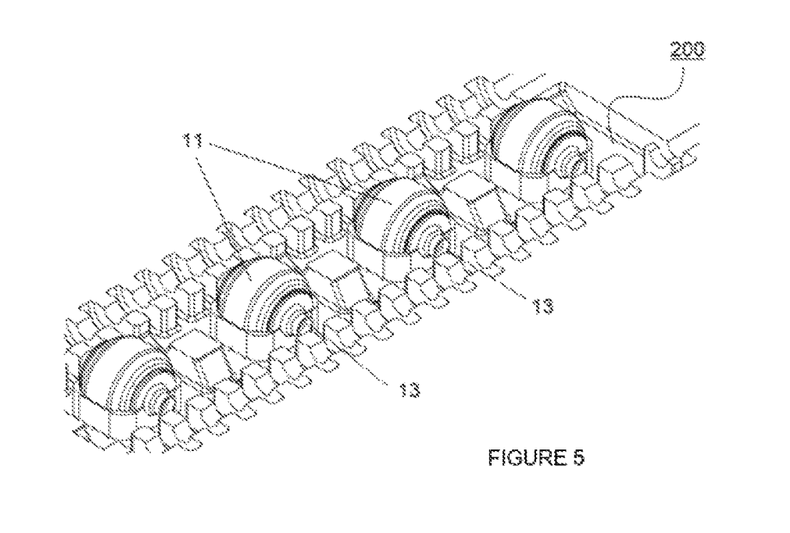
FIG. 5 shows a view of the mold (200) assembly for manufacturing the module (10) shown in FIG. 2.

As can be seen in FIGS. 2 to 5, the module 10 is an essentially rectangular body, the longer sides of which are articulated 101 to allow them to be joined to other adjacent modules by means of a through shaft and the shorter sides of which have a male-female joint 102. The module 10 has a roller 11 embedded in a hole 12, which rotates freely with respect to a shaft 13. This shaft 13 has the particular feature that it is configured as an essentially metal tube that is wider at its central part than at the ends thereof. FIG. 4*a*, in an isolated fashion, shows this configuration in detail.

The manufacturing process of the module 10 in this first practical embodiment consists of a single stage of plastic injection in the mold 200, wherein the shaft 13 is previously arranged, the shaft being previously mounted in the roller 11 before being placed in the mold 200. With the roller 11 and shaft 13 assembly in the mold 200, as can be more easily seen in FIG. 5, the plastic will be injected to form the module 10, such that the plastic will fill the inside of the shaft 13, forming a solid assembly which, without preventing the movement of the roller 11, prevents the removal thereof, unless the connections of the shaft 13 to the module 10 assembly are broken or sawed.

Second Practical Embodiment

In a second practical embodiment, as can be seen in FIGS. 6 to 9, the module 10' is an essentially rectangular body, the longer sides of which are articulated 101 to allow them to be joined to other adjacent modules by means of a through shaft, and the shorter sides of which have a male-female joint 102. The module 10' has a roller 11' embedded in a hole 12' which rotates freely with respect to a shaft 13'. This shaft 13' has the particular feature of being configured as an essentially metal tube, however, unlike the first embodiment, it essentially has the same diameter throughout the entire length thereof, with the ends thereof for joining to the body of the module 10' having a greater diameter than those shown in the first embodiment. This configuration of the shaft (13') is shown in detail in FIG. 8*a*.

The manufacturing process of the module 10' in the second practical embodiment differs with regard to the stages prior to the single injection of the module 10'. In other words, the shaft 13' is first mounted on the mold, on which the roller will later be injected 11'. Then the roller 11' and shaft 13 assembly will be placed in the injection mold 200' of the module 10'. With the roller 11' and shaft 13' configuration in the mold 200', better seen in FIG. 9, the plastic will be injected to form the module 10', such that the plastic will fill the inside of the shaft 13' forming a solid assembly which, without impeding the movement of the roller 11', prevents the removal thereof, unless the connections of the shaft 13' to the module 10' assembly are broken or sawed.

Figure 8:
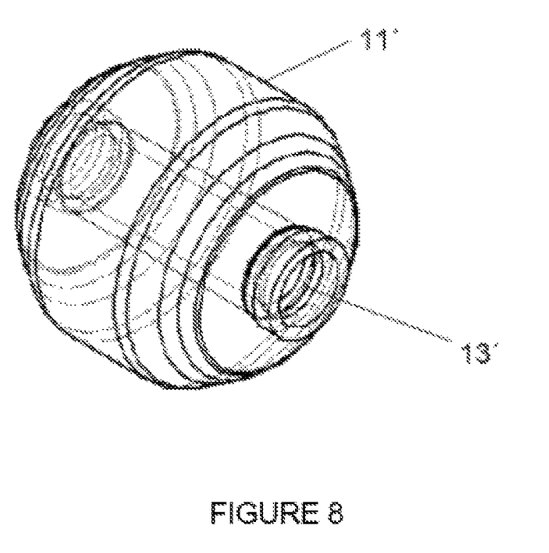
FIG. 8 shows a view of the roller (11') and shaft (13') assembly according to the second practical embodiment of the present invention.
Figure 8A:
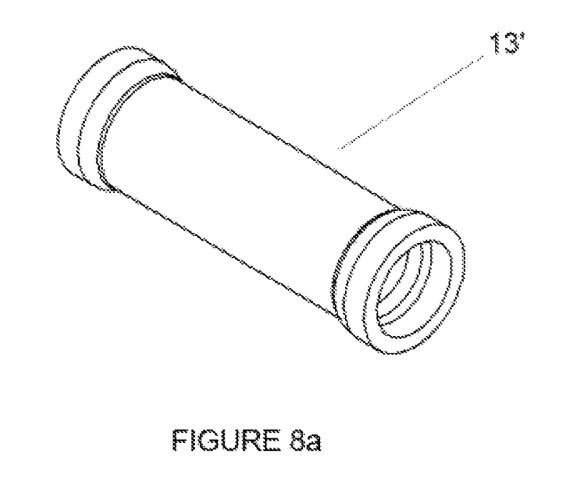
FIG. 8a shows a detailed view of the shaft (13') or shaft-tube (13').
Figure 9:
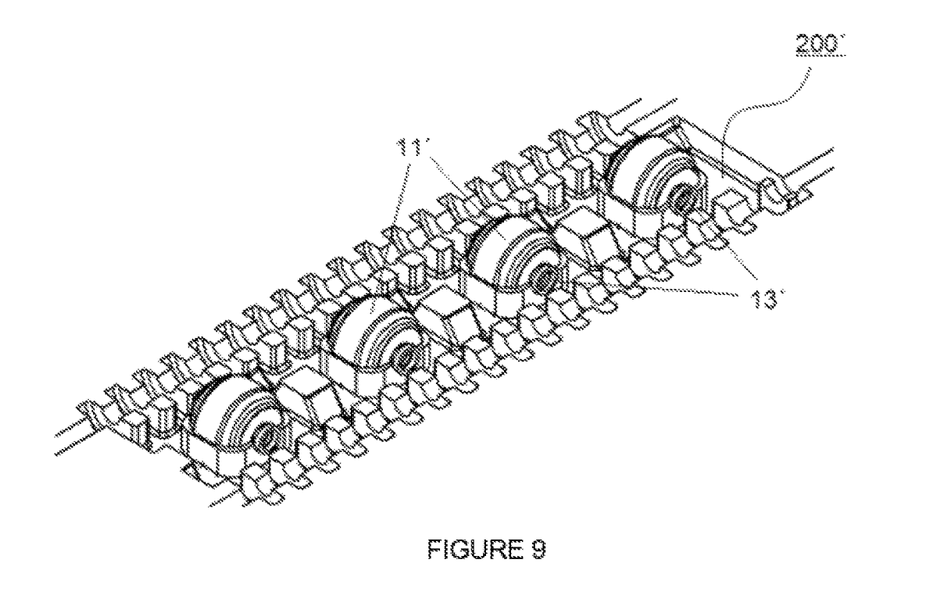
FIG. 9 shows a view of the mold (200') assembly for manufacturing the module (10') shown in FIG. 6.

With respect to the state of the art, this second practical embodiment, using the shaft-tube 13', has a small diametral enlargement at the ends, without having to do so by injection, rather in a simple conformer. In the state of the art, shafts are made of plastic precisely to achieve this special form at the ends, and then are later embedded in the module, which is complicated to do, given that the tubes would have to be machined one by one, something that is not economical or operationally practical. This is the difference and the advantage, not only due to the fact that it is a fillable tube 13', which is the most important aspect, but that it allows us to "mold" the tube in a more reasonable way without having to make it out of plastic and inject it.

In both embodiments, the shafts 13, 13' are configured as reinforcement pins which are in turn, hollow metal tubes. Thus, this tube will not be filled initially, rather it will be filled at the same time as the rest of the plastic modules 10, 10' of the conveyor belt 100 are filled, in the plastic injection process or stage. This way, plastic is injected at the same time inside the pin—which is tubular—joining it to the rest of the module, creating a new resistant brace in addition to the existing braces 14 and 14' in the module 10, 10', configured as an additional reinforcement in the weakest area of the module.

The invention claimed is:

1. A reinforced conveyor belt comprising a plurality of plastic modules, wherein each plastic module further comprises a circular roller which rotates freely with respect to a shaft; wherein the circular roller is embedded in a hole, such that the outer surface of the roller is substantially tangent to a conveyor surface of the reinforced conveyor belt; and wherein the shaft is a metal tube filled with the same molded plastic injected to mold the plastic module and therefore forming a single assembly.

2. The reinforced conveyor belt of claim 1, wherein:
the arrangement or orientation of the rollers is variable, always being diametral, but able to be arranged with a degree of inclination comprised between 0° and 360° with respect to the axis of movement of the reinforced conveyor belt.

3. The reinforced conveyor belt according to claim 1, wherein the roller is solid and monobloc or made of independent parts assembled.

4. A manufacturing process for a reinforced conveyor belt made of a plurality of plastic modules, each plastic module further comprises a roller configured to rotate with respect to a shaft that consists of a metal tube able to be filled with plastic material;
the process comprising the steps of:
inserting the shaft and roller assembly in an injection mold; and
a single injection step of the plastic module, such that injected plastic fills the inside of the tubular shaft forming a single assembly or structure with the body of the plastic module that forms the conveyor belt.

5. The manufacturing process according to claim 4, wherein the roller and the shaft are mounted independently and prior to the insertion thereof in the injection mold.

6. The manufacturing process according to claim 4, wherein the shaft is a tube made of steel and is wider at the central part thereof than at the ends thereof.

7. The manufacturing process according to claim 4, wherein the roller is injected on the shaft prior to the insertion thereof in the injection mold.

8. The manufacturing process according to claim 4, wherein the shaft is a tube made of steel that essentially has the same diameter throughout the entire length thereof except at the ends, where the diameter is greater than at the center.

* * * * *